May 12, 1936.  D. H. HARNLY  2,040,133
RETAINER FOR WEATHER STRIPS
Filed Dec. 31, 1934
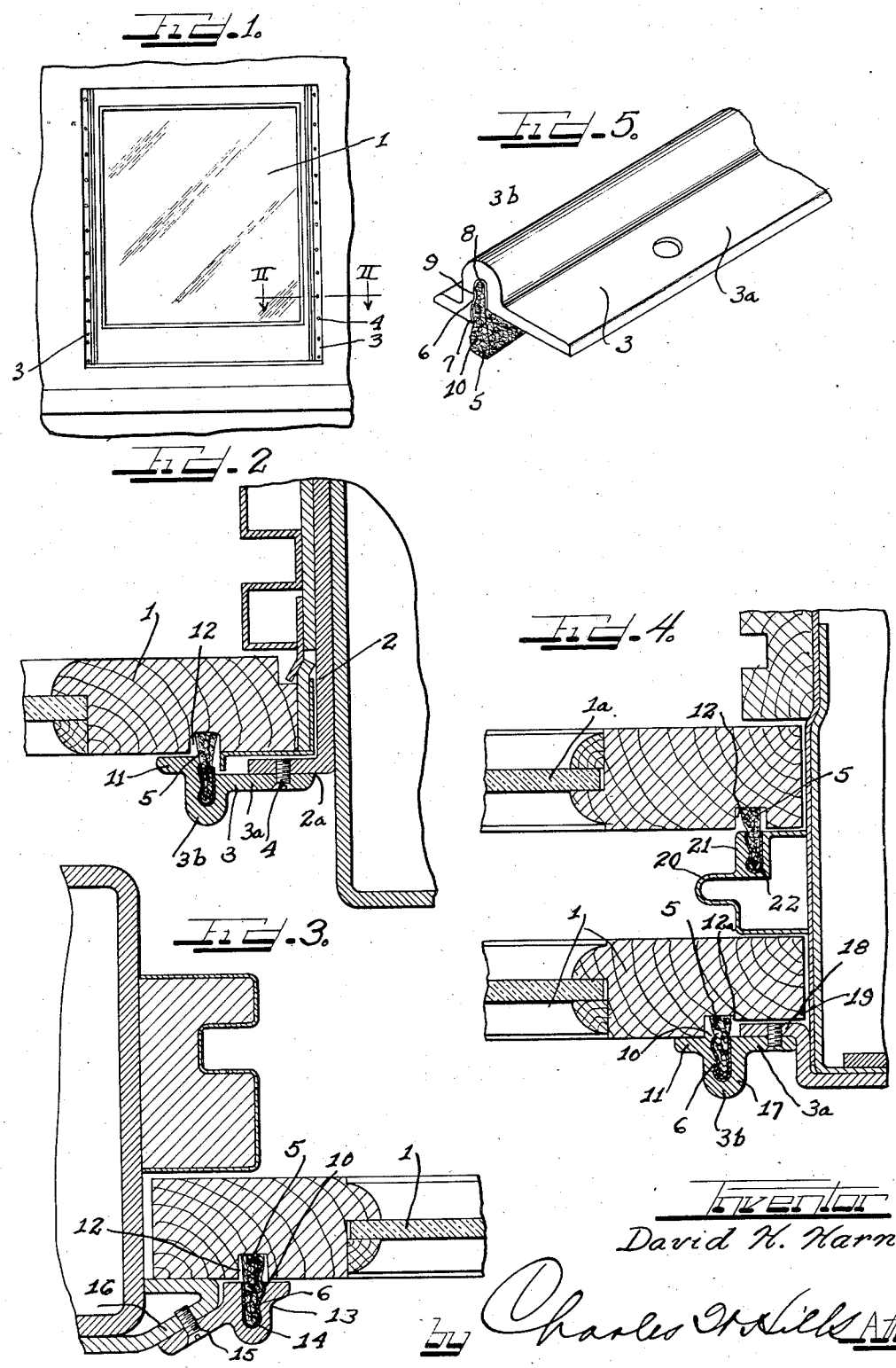

Patented May 12, 1936

2,040,133

UNITED STATES PATENT OFFICE 2,040,133

RETAINER FOR WEATHER STRIP

David H. Harnly, Chicago, Ill.

Application December 31, 1934, Serial No. 759,914

4 Claims. (Cl. 20—69)

This invention relates to a retainer for weather strips and concerns itself with an attaching device in which the weather strip can be slidably interlocked so that it can be readily removed and replaced by a new strip. The retainer can readily be formed to meet the requirements of different structures to which it is designed to be applied.

The invention comprises the novel structure and combination of parts hereinafter described and more particularly pointed out and defined in the appended claims.

In the accompanying drawing which illustrates this invention and in which similar reference numerals refer to similar features in the different views:

Figure 1 is an elevational view of a Pullman car window equipped with retaining devices involving the invention.

Figure 2 is an enlarged fragmentary sectional view taken substantially upon the line II—II of Figure 1.

Figure 3 is an enlarged fragmentary sectional view of a window illustrating a slightly modified form of the invention.

Figure 4 is an enlarged fragmentary sectional view of a window illustrating a further modified form of the invention.

Figure 5 is a fragmentary perspective view of the retainer and weather strip shown in Figures 1 and 2.

The invention illustrated consists primarily in a retainer consisting of an extruded strip of metal formed with a groove to slidably receive a partially encased weather strip; the groove and weather strip having interlocking parts for preventing the weather strip from being laterally disassembled. With this construction it is possible to ship the weather strip and retainers in assembled relation and ready to be applied to both sides of a window as shown in Figure 1.

In Figures 1 and 2, there is shown a Pullman car window 1 having a frame member 2 provided with a flange 2a that forms one of the stops that overlaps a lateral margin of the window. A retaining device 3 involving this invention is removably attached to the flange 2a by means of screws 4.

The retainer is formed with an attaching flange 3a and an outwardly extruded portion 3b forming a groove for receiving a partially encased weather strip 5. With reference to Figure 5, it will be noted that the groove has one wall provided with a slight rounded indentation or rib 6 and a slightly inwardly curved terminal lip 7 and that the casing 8 that partially enclosed the weather strip is provided with a longitudinally extending depression 9 to receive the indentation 6 and a curved edge 10 fitting the contour of the curved lip 7. It will be further noted that the indented wall of the retainer is inwardly offset with respect to the attaching flange 3a and forms a shoulder against which the weather strip 5 abuts. The indented wall terminates in a right angled flange 11 extending in a plane parallel to the plane of the window and closely adjacent thereto. The window 1 is provided with a groove 12 in the adjacent stile to receive the uncased portion of the weather strip 5.

In Figure 3, there is shown a slightly modified form of retainer 13 having a groove 14 similar to the groove in the first form. The attaching flange 15 however extends at an oblique angle so that it can be removably attached to a different design of a window frame member 16. In this form, the indented wall of the retainer is not inwardly offset and the ends of the wall of the groove may be in the same plane. The weather strip 5 in this retainer also extends into a groove in the window stile.

In Figure 4, there is shown a further modified form of retainer 17 which differs from the form shown in Figure 2 by forming the flanges 3a and 11 in the same plane. In Figure 4, the window stile is shown as provided with a rabbeted margin 19 to receive the window stop or frame member 18 and the indented wall requires no inwardly offsetting. In this construction, the window stile is provided with a slightly modified groove 12a to receive the weather strip 5.

It will be noted that Figure 4 illustrates a double window with a box-like stop member 20 therebetween. This box-like stop member is provided with a solid portion 21 provided with a groove 22 similar to the first form for receiving a weather strip 5 extending in a groove 12 in the stile of the window 1a. Each window is designed to be equipped with a pair of retainers.

Thus it will be seen that the retainer can be readily formed for application to different structures and at the same time possess a groove in which the weather strip may be slidably interlocked by an endwise movement.

It will be also appreciated that the weather strip may be slid into the retainer by an endwise longitudinal movement before shipping so that the two devices may be shipped in interlocked relation and ready for application to a window or the like.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a weather proofing structure, a retainer having an attaching flange and a groove and a flange beyond said groove, a weather strip inserted in said groove by an endwise movement, said retainer and weather strip having interfitting parts spaced inwardly from the outer edge of said groove and concealed therein for preventing lateral displacement of said weather strip.

2. In a weather proofing structure, a retainer having a longitudinally extending groove provided with a longitudinally extending rib extending from an intermediate portion of one wall thereof, an encased weather strip having an intermediate longitudinally extending depression fitting said rib and insertable in said groove by an endwise sliding movement, said rib and depression preventing lateral displacement of said weather strip.

3. In a weather proofing structure, a retainer having an attaching flange and an extruded portion adjacent said flange, said extruded portion forming a groove and terminating in a flange lying in a different plane than said attaching flange, a weather strip insertable endwise in said groove, said weather strip and one wall of said groove having interfitting parts intermediate the edges thereof and concealed in said groove for retaining said weather strip against outward lateral displacement.

4. In a weather proofing structure, a retaining member comprising a metal strip having a laterally offset portion intermediate the edges thereof, said offset portion having a groove adapted for slidably receiving a weather strip by an endwise movement, said weather strip and one wall of said groove having intermediate interfitting slidably related parts concealed in said groove for interlocking said parts against relative lateral movement.

DAVID H. HARNLY.